US010120889B2

(12) United States Patent
Chandrasekhar

(10) Patent No.: US 10,120,889 B2
(45) Date of Patent: Nov. 6, 2018

(54) PROSPECTIVE SEARCH OF OBJECTS USING K-D FOREST

(71) Applicant: Facebook, Inc., Menlo Park, CA (US)

(72) Inventor: Vikram Chandrasekhar, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 596 days.

(21) Appl. No.: 14/704,673

(22) Filed: May 5, 2015

(65) Prior Publication Data

US 2015/0234876 A1 Aug. 20, 2015

Related U.S. Application Data

(63) Continuation of application No. 13/599,012, filed on Aug. 30, 2012, now Pat. No. 9,058,347.

(51) Int. Cl.

*G06F 17/30* (2006.01)
*H04L 29/08* (2006.01)
*H04L 29/06* (2006.01)

(52) U.S. Cl.

CPC .. *G06F 17/30327* (2013.01); *G06F 17/30598* (2013.01); *H04L 65/403* (2013.01); *H04L 67/10* (2013.01)

(58) Field of Classification Search

CPC ................................................ G06F 17/30327

See application file for complete search history.

(56) References Cited

U.S. PATENT DOCUMENTS

2010/0131714 A1* 5/2010 Chandrasekaran .......................... G06F 12/0875 711/124
2010/0281230 A1* 11/2010 Rabii .................... G06F 3/0605 711/165
2012/0131070 A1* 5/2012 Bacon ................ G06F 12/0261 707/815

* cited by examiner

*Primary Examiner* — Taelor Kim

(74) *Attorney, Agent, or Firm* — Baker Botts L.L.P.

(57) ABSTRACT

In one embodiment, a method includes receiving a content object; and determining whether a list configured to store information of a pre-determined number of stored content objects is full. Each content object is represented as a vector of elements. The method also includes identifying a corresponding node of a k-dimensional tree for each of the stored content objects and the received content object based on determining one or more median vectors from the vectors of the content objects. Each node of the k-dimensional tree is configured to store the vector of a particular one of the content objects. The method also includes moving information corresponding to the vector of one or more of the stored content objects and the received content object from the list to the corresponding node of the k-dimensional tree.

16 Claims, 9 Drawing Sheets

600

PROSPECTIVE SEARCH OF OBJECTS USING K-D FOREST

PRIORITY

This application is a continuation under 35 U.S.C. § 120 of U.S. patent application Ser. No. 13/599,012, filed 30 Aug. 2012.

TECHNICAL FIELD

This disclosure generally relates to prospectively searching for objects having specific contents.

BACKGROUND

In computer science, a k-dimensional tree, or k-d tree for short, is a space-partitioning data structure for organizing data points in a k-dimensional space. k-d trees are a useful data structure for many applications, such as searches involving a multidimensional search key.

SUMMARY OF PARTICULAR EMBODIMENTS

In particular embodiments, a social-networking system may receive data objects from its users and store these data objects in the system. For example, a data object may be an image, which a user uploads to the social-networking system. Sometimes, the social-networking system may identify data objects having specific types of contents. For example, for policy reasons, the social-networking system may identify images having pornographic, hateful, racist, dangerous, violent, or offensive contents so that such undesirable or unsuitable images are not freely shared among its users.

In particular embodiments, the social-networking system may maintain a list of data objects having specific types of contents. For example, the social-networking system may maintain a blacklist of images having undesirable or unsuitable contents. This blacklist of images may be updated as needed. New images with undesirable or unsuitable contents may be added to the blacklist as they become known to the social-networking system. Then, when an image is uploaded to the social-networking system (e.g., by a user), the content of this image may be compared with the contents of the images on the blacklist. If the content of this image substantially matches the content of at least one image on the blacklist, this image may be identified for further action (e.g., the social-networking system may block this image).

In particular embodiments, a collection of objects (e.g., images) may be stored in a k-d forest, which is a collection of k-dimensional trees, or k-d trees for short. Each k-d tree may be used to store a subset of the objects. More specifically, the k-d trees may be balanced in order to maintain good performance when performing searches on the k-d trees. Frequent additions and deletions may cause a balanced k-d tree to become unbalanced. In particular embodiments, by using a k-d forest, each tree in the forest is kept balanced. Consequently, a logarithmic, rather than linear, search process may be used to search the balanced trees, thus achieving good performance during searches.

In particular embodiments, objects (e.g., images) may be grouped into clusters. Each cluster includes objects having the same or similar content. A cache structure may be used in connection with a k-d forest for storing objects. In this case, each cluster has a representative object. The representative object of each cluster is stored in the k-d forest. In addition, each entry in the cache corresponds to a specific cluster of objects, keyed by the representative object of that cluster. Such a cache may be used to identify specific types of objects.

DESCRIPTION OF EXAMPLE EMBODIMENTS

In particular embodiments, a system, such as a social-networking system, may identify data objects uploaded to the system (e.g., by its users) that have specific types of contents. For example, the social-networking system may receive data objects, such as images, videos, or texts, from its users and store these data objects in the system. However, for various policy reasons, some of these data objects may have contents that are considered undesirable or unsuitable to the social-networking system. For example, some images may have pornographic (especially child pornography), hateful, racist, dangerous, violent, or offensive contents. Upon receiving an image, the social-networking system may examine its content to determine whether the image has such undesirable or unsuitable contents and to take appropriate actions with respect to the image when necessary.

Figure 1:
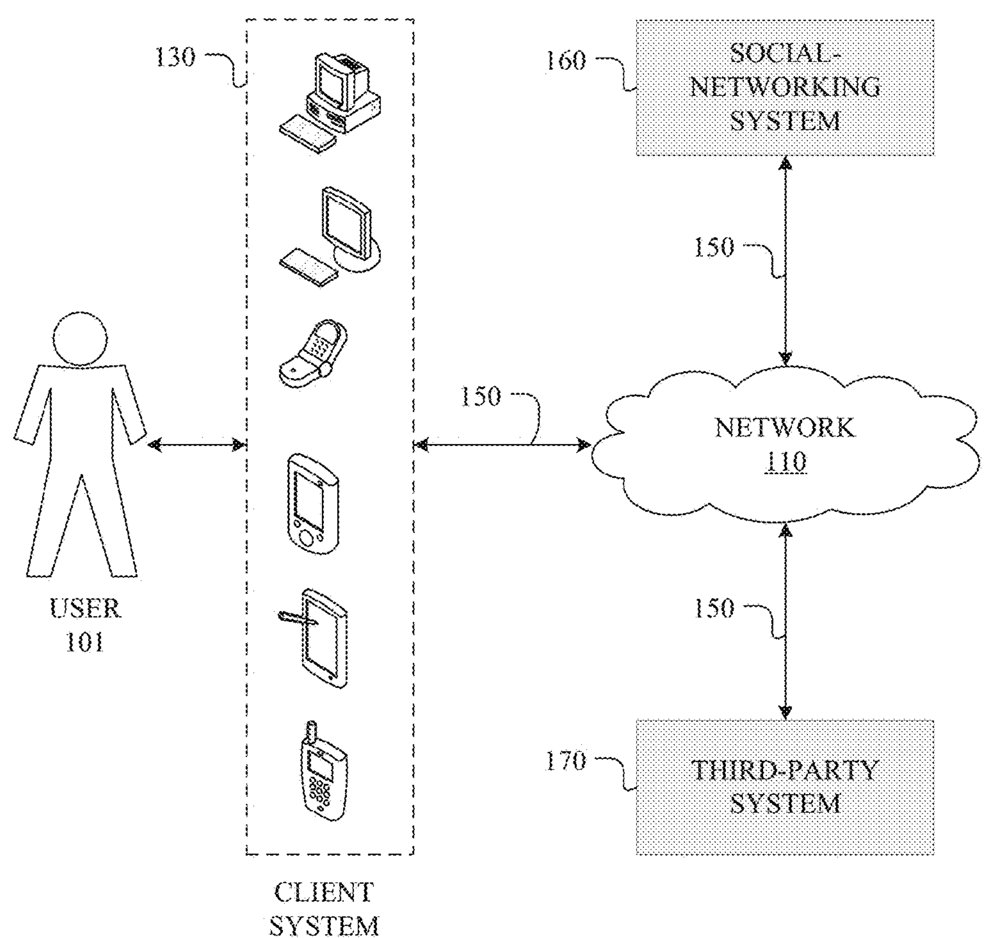
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various functions. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a Smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social-networking system 160 may store various types of data. In particular embodiments, such data may be stored in a graph having any number of nodes and edges, where each edge connects two nodes. The graph is often referred to as a "social graph" as it contains, among others, social information.

Figure 2:
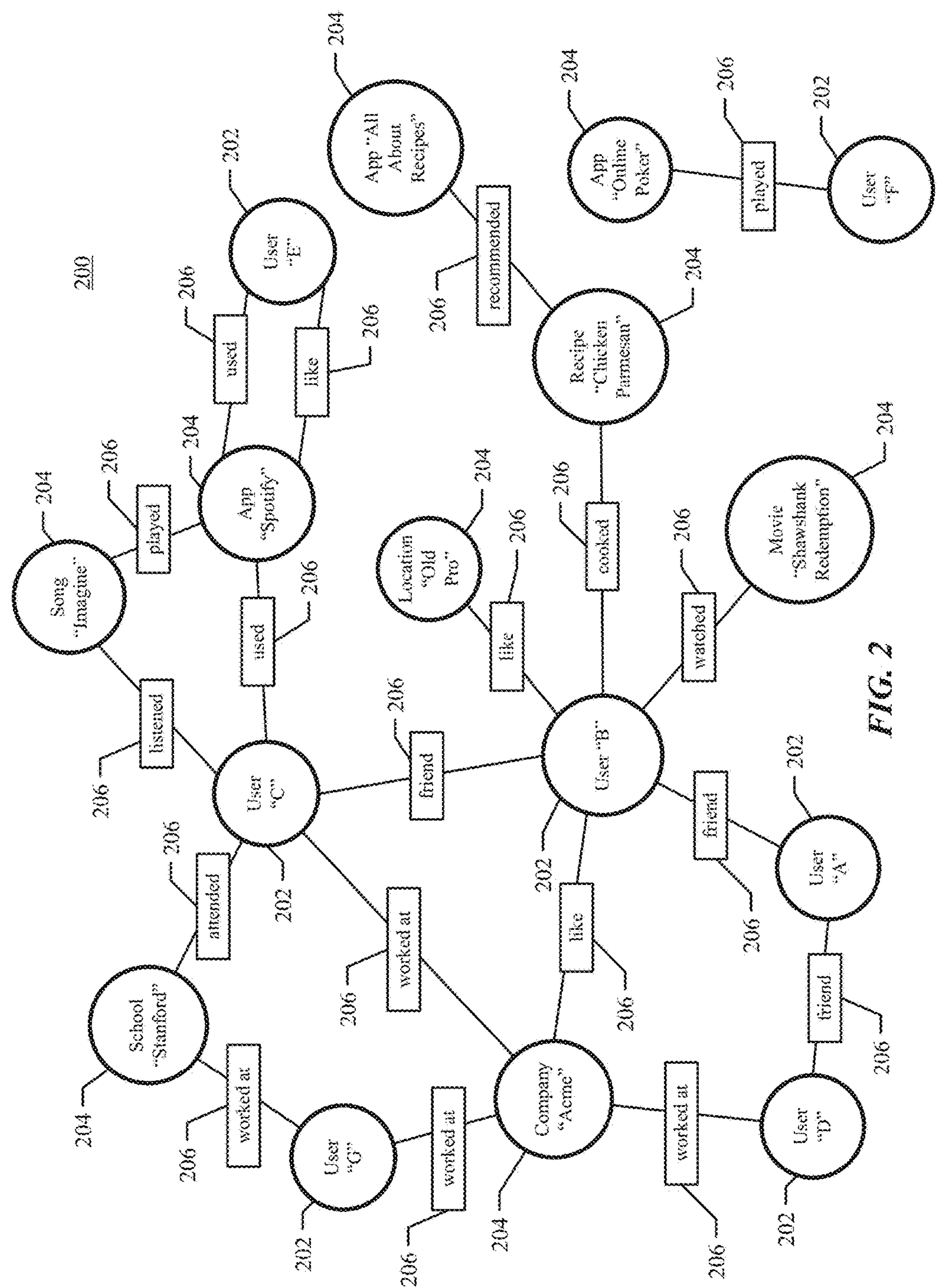
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Users 101 of social-networking system 160 may upload data objects, such as images, videos, or texts, to social-networking system 160 to be stored therein. Each data object may be represented by a specific node in social graph 200. Furthermore, an edge may connect the node representing the data object and the node representing the user uploading the data object.

Figure 3:
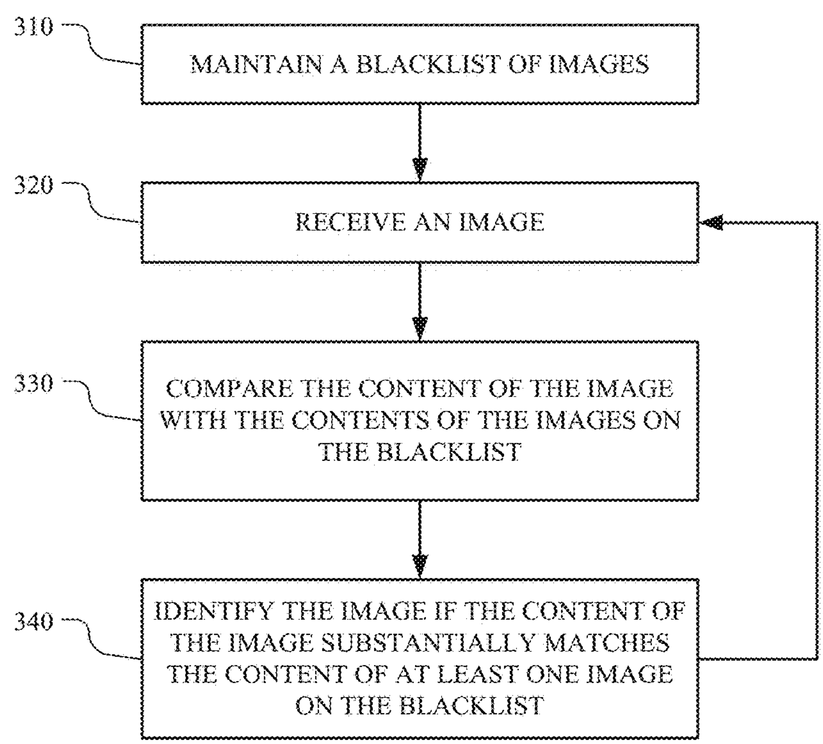
FIG. 3 illustrates an example method for conducting a prospective search of an image based on a blacklist of images.

In particular embodiments, when a data object (e.g., an image) is uploaded to social-networking system 160, social-networking system 160 may verify the content of the data object to ensure that it does not contain undesirable or unsuitable content. For example, when an image is uploaded to social-networking system 160, social-networking system 160 may verify that this image does not have pornographic, hateful, racist, dangerous, violent, or offensive content. FIG. 3 illustrates an example method for conducting a prospective search of an image based on a blacklist of images.

In particular embodiments, at STEP 310, social-networking system 160 may maintain a blacklist of known images having specific types of contents, such as undesirable or unsuitable contents. Of course, the images on the blacklist are not necessarily undesirable images always. In fact, in particular embodiments, the images on the blacklist may be divided into categories. Alternatively, a separate list may be created for each category of images. One category may include pornographic images. Another category may include violent images. However, a third category may include images of world-famous monuments, while a fourth category may include images of celebrities. In this sense, the images on the blacklist are those having specific types of contents of particular interest to, for example, social-networking system 160. By comparing other images with images on the blacklist, images having specific types of contents may be identifies. With some implementations, social-networking system 160 may maintain a blacklist of images as well as a whitelist of images. In this case, the images on the blacklist may have undesirable contents, and the images on the whitelist do not necessarily have undesirable contents but may have certain types of contents of particular interests to social-networking system 160 or its users. Either list may be used to identify images in the system having various types of contents.

At STEP 320, when social-networking system 160 receives an image (e.g., when an image is uploaded to social-networking system 160 by a user), the content of this image is compared to the contents of the images on the blacklist, at STEP 330. At STEP 340, if the content of this image substantially matches the content of any images on the blacklist, this image may be identified so that social-networking system 160 may take appropriate actions with respect to this image (e.g., block this image).

In particular embodiments, when comparing an image with images on the blacklist, only a specific category or categories of images on the blacklist may be used. For example, if the purpose is to block images having undesirable contents, the system may only compare the image against those images on the blacklist that belong to categories such as pornographic, racist, and violent images. On the other hand, if the purpose is to locate all the images of sport celebrities, the system may only compare the image against those images on the blacklist that belong to the sport celebrity category. This way, images having a specific type of content may be identified by comparing each received image with the appropriate categories of images on the blacklist.

In particular embodiments, an image-matching algorithm may be used to compare two images. Some image-matching algorithms are capable of performing a fuzzy, instead of exact, match between two images. Examples of such image-matching algorithms include, but not limited to, Discrete Wavelet Transform (DWT) based image hash, hashing via Singular value Decomposition (SVD), and feature point based image hashing. With particular implementations, an image-matching technology called PhotoDNA developed by Microsoft Inc. may be employed to compare the contents of two specific images. Briefly, given an image (e.g., a JPEG file of a digital photograph), PhotoDNA generates a 144-element vector (i.e., a vector having 144 elements) representing the content of the image. Each element in the vector is 1 byte. This set of 144 elements (i.e., the 144-element vector) is also referred to as the "hash" of the image. Since these elements represent the content of an image, they are essentially the "fingerprint" of the image. To compare the contents of two specific images, image X and image Y, a set of 144 elements, $x_1 \ldots x_{144}$, is generated for image X, and a set of 144 elements, $y_1 \ldots y_{144}$, is generated for image Y. The proximity measurement between image X and image Y may then be computed as $$\sum_{i=1}^{144} (x_i - y_i)^2.$$

The contents of image X and image Y are considered substantially the same (i.e., matching) if the proximity measurement between image X and image Y is less than a predefined threshold.

The advantage of some image-matching algorithms (e.g., PhotoDNA) is that the technology performs a fuzzy match, instead of an exact match, of the contents of two images. In other words, it is not necessary for the two images to have exactly the same content in order for such an image-matching algorithm to find a match. Instead, even when there are slight variations between the two images (e.g., one image is slightly cropped from the other image, one image is slightly larger than the other image, or one image has an extra element not found in the other image), the image-matching algorithm can still find a match if the variations are sufficiently minor. How much variation can be tolerated is controlled by the threshold value. The larger the threshold value, the more variation tolerance, and vice versa.

Using a suitable image-matching algorithm (e.g., PhotoDNA), a set of elements (i.e., the hash) is generated for each image on the blacklist maintained by social-networking system 160. Then, when an image is uploaded to social-networking system 160, a set of elements (i.e., the hash) is also generated for this image. This image is then compared with one or more images on the blacklist by computing the proximity measurement between this image and each image on the blacklist using their respective sets of elements. If the proximity measurement between this image and an image on the blacklist is sufficiently small (i.e., less than a predefined threshold value), then the content of this image is considered to substantially match the content of that image on the blacklist.

Particular embodiments may repeat one or more steps of the method of FIG. 3, where appropriate. For example, STEPS 320, 330, and 340 may be repeated each time an image is received at social-networking system 160. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In practice, a blacklist may include a large number of images. To compare an image (e.g., an image uploaded to social-networking system 160) with each and every image on the blacklist can take a very long time. To improve performance, in particular embodiments, the images on a blacklist may be stored in one or more k-d trees, and more specifically, balanced k-d trees.

An image-matching algorithm, such as PhotoDNA, is capable of generating a set of 144 elements for an image that represents the content of the image. These 144 elements may be considered the "fingerprint" of the image. In addition, PhotoDNA is also capable of generating a reduced set of 16 elements for an image that represents, for example, the main or key content features of the image (i.e., the reduced "fingerprint" of the image). The set of 16 elements generated for each image may be used to partition a set of images into a k-d tree.

Figure 4:
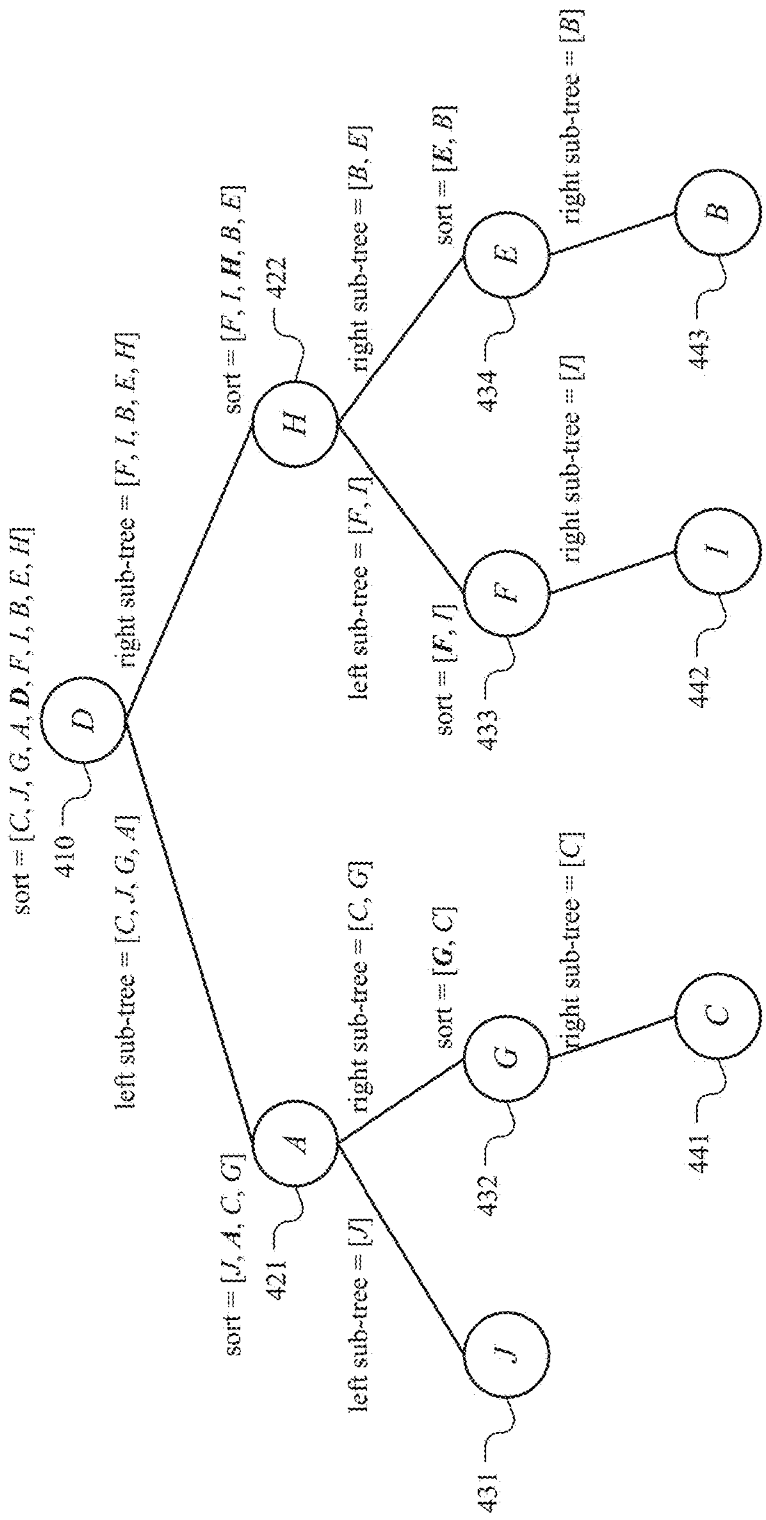
FIG. 4 illustrates an example k-d tree storing 10 images.

To further explain, consider a specific example illustrated in FIG. 4. Suppose that there are 10 images, image A to J, to be partitioned into a k-d tree. Note that a small number of images are used to illustrate the process while simplifying the discussion. In practice, the process may be similarly applied to any number of images.

For image A, PhotoDNA may generate a set of 16 elements, $a_1 \ldots a_{16}$, as well as a set of 144 elements, $a_1 \ldots a_{144}$. For image B, PhotoDNA may generate a set of 16 elements, $b_1 \ldots b_{16}$, as well as a set of 144 elements, $b_1 \ldots b_{144}$. For image C, PhotoDNA may generate a set of 16 elements, $c_1 \ldots c_{16}$, as well as a set of 144 elements, $c_1 \ldots c_{144}$. And so on.

The 10 images may be spatially partitioned into the k-d tree based on their respective sets of 16 elements. At level 1 of the k-d tree, the 10 images are sorted according to their respective first one of the 16 elements (i.e., the first element from each 16-element vector as $a_1$, $b_1$, $c_1 \ldots j_1$). Suppose that the 10 images are sorted as C, J, G, A, D, F, I, B, E, H. The image in the middle or the median image, image D, is stored in node 410 at level 1 of the tree. Those images to the left of image D, images C, J, G, and A, are stored in the left sub-tree of node 410, while those images to the right of image D, images F, I, B, E, and H, are stored in the right sub-tree of node 410.

At level 2 of the k-d tree, there are two nodes 421 and 422. For node 421 (i.e., the left child node of node 410), images C, J, G, and A are sorted according to their respective second one of the 16 elements (i.e., the second element from each 16-element vector as $c_2$, $j_2$, $g_2$, $a_2$). Suppose that these 4 images are now sorted as J, A, C, G. The median image, image A, is stored in node 421 at level 2. The image to the left of image A, images J, is stored in the left sub-tree of node 421, while those images to the right of image A, images C and G, are stored in the right sub-tree of node 421. For node 422 (i.e., the right child node of node 410), again, images F, I, B, E, and H are sorted according to their respective second one of the 16 elements (i.e., $f_2$, $i_2$, $b_2$, $e_2$, $h_2$). Suppose that these 5 images are now sorted as F, I, H, B, E. The image in the middle, image H, is stored in node 422 at level 2. The images to the left of image H, images F and I, are stored in the left sub-tree of node 422, while those images to the right of image H, images B and E, are stored in the right sub-tree of node 422.

At level 3 of the k-d tree, the left sub-tree of node 421 only has one image, image J. Thus, there is no need to sort anymore. Image J is stored in node 431, which is the left child node of node 421.

For node 432, which is the right child node of node 421, images G and C are sorted according to their respective third one of the 16 elements (i.e., the third element from each 16-element vector as $g_3$, $c_3$). Suppose that these 2 images are now sorted as G, C. The median image, image G, is stored in node 432. There is no image to the left of image G and thus no left sub-tree. The image to the right of image G, image C, is stored in the right sub-tree of node 432.

For node 433, which is the left child node of node 422, images F and I are sorted according to their respective third one of the 16 elements (i.e., $f_3$, $i_3$). Suppose that these 2 images are now sorted as F, I. The median image, image F, is stored in node 433. There is no image to the left of image F and thus no left sub-tree. The image to the right of image F, image I, is stored in the right sub-tree of node 433.

For node 434, which is the right child node of node 422, images B and E are sorted according to their respective third one of the 16 elements (i.e., $b_3$, $e_3$). Suppose that these 2 images are now sorted as E, B. The median image, image E, is stored in node 434. There is no image to the left of image E and thus no left sub-tree. The image to the right of image E, image B, is stored in the right sub-tree of node 434.

At level 4 of the k-d tree, node 441 is the right child node of node 432. The right sub-tree of node 432 only has one image, image C. There is no need to sort at this point, and image C is stored in node 441. Similarly, image I is stored in node 442, which is the right child node of node 433, and image B is stored in node 443, which is the right child node of node 434.

To generalize the example illustrated in FIG. 4, a set of images may be partitioned into a k-d tree level by level. For each image in the set, a set of k elements may be generated. Note that although the example illustrated in FIG. 4 uses 16 as a specific value for k, k may be set to any suitable value. At each level i, given a specific node at level i, the sub-set of images belonging to this portion of the tree is sorted according to their respective $i^{th}$ one of the k elements. The median image is then stored in the node. The images to the left of the median image, if any, are stored in the left sub-tree of the node, and the images to the right of the median image, if any, are stored in the right sub-tree of the node.

If the tree has more than k levels, the sorting of the images repeats the cycle of k elements. Thus, at level k+1, the first one of the k elements is used again to sort the images; at level k+2, the second one of the k elements is used again to sort the images; and so on, until all the images in the set are partitioned into the tree. In other words, at each level i, the (i mod k)th element is used to sort the images, when appropriate.

This process ensures that the resulting tree is balanced. In particular embodiments, each image may have a unique identifier. At each node, the identifier, the set of 16 elements, and the set of 144 elements of the corresponding image are stored. With specific implementations, given a specific image, its identifier, the set of 16 elements, and the set of 144 elements may be stored in a block of memory. An index (e.g., a memory reference pointer) may indicate the beginning address of that block of memory. This index may be stored in the corresponding node of the k-d tree.

With some implementations, each k-d tree may be used to store $2^n-1$ images, where n may be some positive integer. Storing $2^n-1$ images in each k-d tree ensures that the resulting k-d tree is balanced. For example, consider the image partitioning process described above. In the first partitioning step, the set of $2^n-1$ vectors (each vector corresponding to one image and includes k elements representing that image) gets partitioned into two sets of $2^{n-1}-1$ vectors and a median vector. This assures that both sub-trees of the new median node, created out of the median vector, have the same number of nodes. The second partitioning step takes each set of $2^{n-1}-1$ vectors and partitions it into two sets of $2^{n-2}-1$ vectors and a median vector. This process continues until eventually there are 3 vectors that get partitioned into 2 vectors, which become two leaf nodes, and a median vector, which becomes a median node. Thus, each partitioning step guarantees that the resulting sub-trees are of equal sizes. Consequently, the choice of $2^n-1$ as the number of nodes (i.e., corresponding to images) to be stored in each k-d tree results in a perfectly balanced k-d tree. For example, when n=21, $2^{21}-1$=2097152−1=2097151 nodes, or approximately 2 million nodes, are stored in each k-d tree Conducting search through a k-d tree is faster than a straightforward comparison. For example, suppose that an image, image X (e.g., image X may be uploaded to the system), is to be compared with the 10 images in the above example (e.g., images A-J may be images on a blacklist), which have already been stored in a k-d tree as illustrated in FIG. 4. Without using a k-d tree, image X needs to be compared with each and every one of the 10 images. This requires 10 comparisons (e.g., computing 10 proximity measurements respectively between image X and each of the 10 images). However, using a k-d tree, image X only needs to be compared with some of the 10 images, but not necessarily all of the 10 images. The comparison algorithm traverses the k-d tree down recursively level by level, starting from the root node. At each level, the sub-tree that does not need to be searched is discarded.

With specific implementations, each image uploaded to the system may also have its own set of 16 elements and set of 144 elements generated using PhotoDNA. Thus, for image X, PhotoDNA may generate a set of 16 elements, $x_1 \ldots x_{16}$, and a set of 144 elements, $x_1 \ldots x_{144}$.

To further explain the recursive comparison algorithm, consider the specific case of comparing image X with image D. In the example illustrated in FIG. 4, image D is stored in node 410, which is the root node of the k-d tree. First, the proximity measurement between images X and D using their respective sets of 16 elements is computed (e.g., proximity measurement $$\left(\text{e.g., proximity measurement 1} = \sum_{i=1}^{16} (x_i - y_i)^2\right).$$

If a potential match is found (e.g., the first proximity measurement computed using the 16 elements is less than a threshold value), then images X and D are compared again using their respective sets of 144 elements $$\left(\text{e.g., proximity measurement 2} = \sum_{i=1}^{144} (x_i - y_i)^2\right)$$

to further confirm the match. This way, whether two images substantially match in content may be determined quickly because in most cases, only the first proximity measurement may need to be computed, and computing the first proximity measurement is faster than computing the second proximity measurement (i.e., 16 elements vs. 144 elements). If the second proximity measurement computed using the 144 elements is also less than the threshold value, this means that a match is found (i.e., the content of image D substantially matches the content of image X). The search of this k-d tree can end at this point (i.e., there is no need to compare image X with the other images also stored in this particular k-d tree), and image D may be identified.

On the other hand, if either the first or the second proximity measurement between images X and D is greater than or equal to the threshold, this means that the content of image D does not match that of image X. The search algorithm decides whether to search the left sub-tree or the right sub-tree of node 410. The element used to sort the images at this level during the construction of the k-d tree is used. Since node 410 is at level 1 of the k-d tree, the first of the 16 elements should be used. (For level 2, the second element from the 16-element vector should be used. For level 3, the third element from the 16-element vector should be used. And so on.) Each image has a corresponding 16-element vector. For image X, the first element from the set of 16 elements is $x_1$. For image D, the first element from the set of 16 elements is $d_1$. Thus, $x_1$ and $d_1$ are compared.

If the square of the difference between $x_1$ and $d_1$, $(x_1-d_1)^2$, is greater than the threshold value, then one of the sub-trees of node 410 (i.e., image D) may be eliminated. In this case, if $x_1 \leq d_1$, then all the nodes in the right sub-tree of node 410, which correspond to images H, F, E, I, and B, will each have a proximity measurement value with image X that is greater than the threshold. For example, image H with the hash $h_1 \ldots h_{16}$ will have a proximity measurement value with image X as $$\sum_{i=1}^{16} (x_i - h_i)^2.$$

Since $h_1 > d_1 \leq x_1$, it means $(x_1 - h_1)^2 > (x_1 - d_1)^2$. Hence, the proximity measurement between images H and X will definitely be higher than the threshold, and so there is no need to compare image X with image H. The same reasoning applies to images F, E, I, and B (i.e., all the images in the right sub-tree of node 410). Therefore, the right sub-tree of node 410 (i.e., image D) may be ignored if $x_1 \leq d_1$. Instead, the recursive algorithm proceeds down to the left sub-tree of node 410. In this case, the image to be compared during the next recursive iteration is image A at node 421, which is the left child of node 410.

On the other hand, if $x_1 > d_1$, then all the nodes in the left sub-tree of node 410, which correspond to images A, J, G, and C, will each have a proximity measurement value with image X that is greater than the threshold. For example, image A with the hash $a_1 \ldots a_{16}$ will have a proximity measurement value with image X as $$\sum_{i=1}^{16} (x_i - a_i)^2.$$

Since $a_1 \leq d_1 < x_1$, it means $(x_1 - a_1)^2 > (x_1 - d_1)^2$. Hence, the proximity measurement between images A and X will definitely be higher than the threshold, and so there is no need to compare image X with image A. Again, the same reasoning applies to images J, G, and C (i.e., all the images in the left sub-tree of node 410). Therefore, the left sub-tree of node 410 (i.e., image D) may be ignored if $x_1 > d_1$. Instead, the recursive algorithm proceeds down to the right sub-tree of node 410. In this case, the image to be compared during the next recursive iteration is image H at node 422, which is the right child of node 410.

If the square of the difference between $x_1$ and $d_1$, $(x_1 - d_1)^2$, is less than or equal to the threshold value, then both the left and the right sub-trees of node 410 (i.e., image D) need to be searched. In this case, the recursive algorithm proceeds down to node 421 and compares image X with image A, as well as proceeds down to node 422 and compares image X with image H. With some implementations, the two comparisons may be performed in parallel (e.g., applying appropriate parallel processing or multi-threading techniques).

If the current node (i.e., node 410 in this case) has no child node, the recursion may end. Note that it is possible that the content of image X does not match the content of any image in a k-d tree, in which case no image in the k-d tree is identified.

The process described above with images X and D may be similarly applied during each recursive iteration as the search algorithm traverses down the k-d tree. For example, suppose that during the second iteration, image X is to be compared with image A. The process described above may then be applied to images X and A (i.e., with image A in the place of image D). The recursion may end either when a match is found between image X and an image stored at a particular node in the tree or when a leaf node is reached since a leaf node has no child.

In particular embodiments, social-networking system 160 may update the blacklist of images from time to time. For example, as additional images with undesirable or unsuitable contents become known to social-networking system 160 (e.g., through user reporting), these images may be added to the blacklist. Thus, the blacklist of images may expand as time passes. For example, suppose that at time $t_1$, the blacklist contains 1000 images. Further suppose that 100 images have been added to the blacklist between time $t_1$ and time $t_2$. Thus, at time $t_2$ (some time after time $t_1$), the blacklist contains 1100 images. Similarly, the images uploaded to and stored in social-networking system 160 also increase in size as time passes.

While objects (e.g., images) may be added to or deleted from a k-d tree, frequent additions or deletions cause the tree to become imbalanced and skewed. When this happens, search performance deteriorates rapidly. In order to maintain good performance for searches conducted on k-d trees (i.e., in order to keep k-d trees balanced), in particular embodiments, a k-d forest of balanced k-d trees is used to store objects (e.g., images) that need to be updated from time to time. Each k-d tree in the forest is always balanced.

Figure 5:
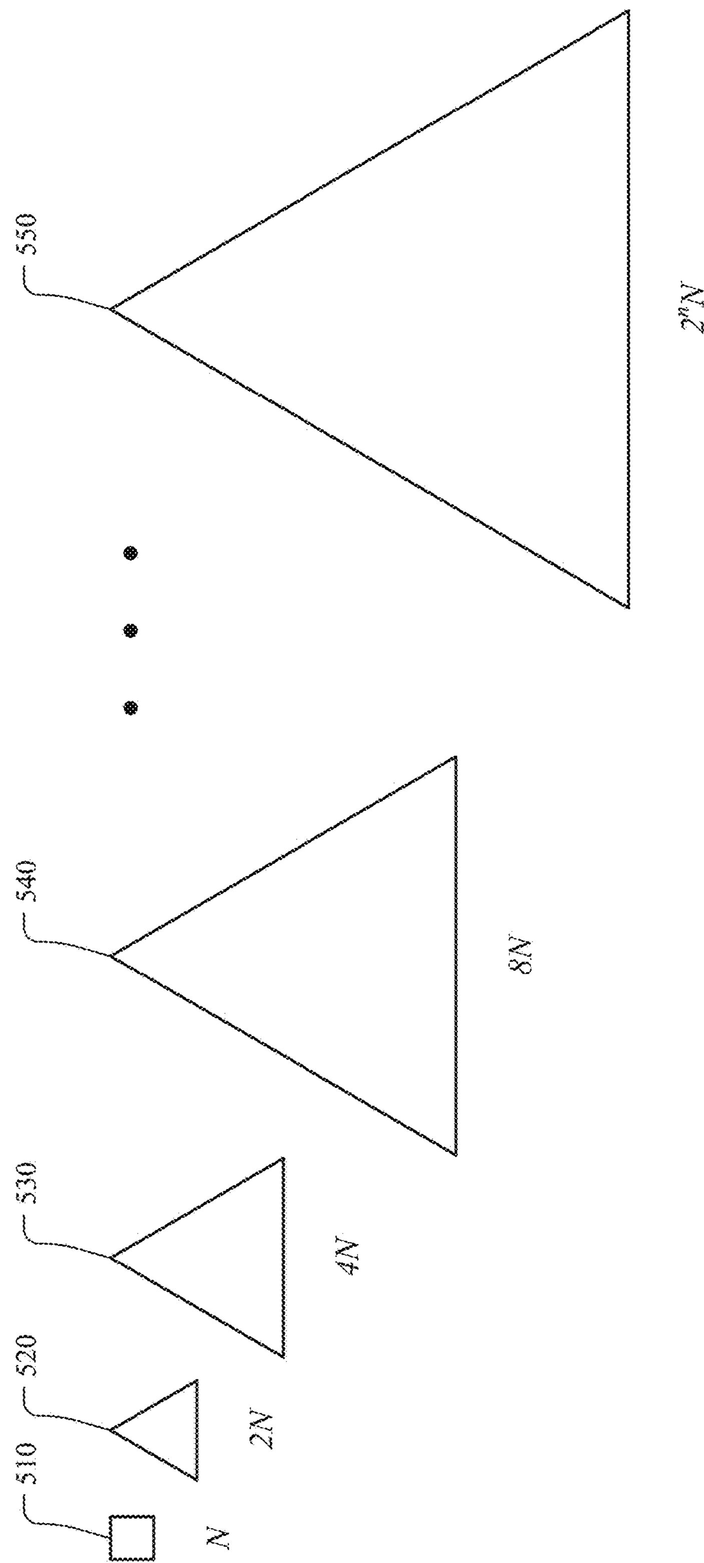
FIG. 5 illustrates an example k-d forest for storing images.

In particular embodiments, a dynamic collection of objects (e.g., images) may be stored in a k-d forest. A k-d forest is a collection of k-d trees, and more specifically balanced k-d trees, and may be updated dynamically. In addition, there is a single bucket (e.g., a list), for holding the objects. FIG. 5 illustrates an example k-d forest, which may be used to store images. With particular implementations, a k-d forest consists of a bucket and a collection of k-d trees of varying sizes sorted according to their respective sizes. The bucket has a specific size N and can hold at most N objects. The first k-d has a size 2N, which is twice as big as the bucket, and can be used to store at most 2N objects. Each subsequent tree is twice as big as the previous tree. As illustrated in FIG. 5, bucket 510, which is the first element in the forest, has a size N (i.e., bucket 510 can be used to store at most N images); the first k-d tree 520, which is the second element in the forest, has a size 2N; the second k-d tree 530, which is the third element in the forest, has a size 4N; the third k-d tree 540, which is the fourth element in the forest, has a size 8N; and so on. The last k-d tree 550 has a size $2^n$N. N and n may have any values, which may be selected based on the needs of specific applications. For example, the value of N may be 4096 and the value of n may be 12. With particular implementations, each k-d tree may be implemented as a memory buffer of an appropriate size.

To add images to the k-d forest, as images become available, they are first added to bucket 510 (i.e., the first and smallest tree in the forest). Since bucket 510 is a list, images may be added to it as they become available (i.e., dynamically). As bucket 510 reaches its size limit (i.e., N images), when the $(N+1)^{th}$ image is to be added to the forest, at this point bucket 510 already contains N images and is full, and thus, the $(N+1)^{th}$ image causes an overflow to a k-d tree in the forest that is currently empty. At this point the smallest tree in the forest that is empty is k-d tree 520. Thus, the $(N+1)^{th}$ image is overflowed to and stored in k-d tree 520. In addition, the images stored in bucket 510 and all the trees smaller than k-d tree 520 that can also fit in k-d tree 520 are also moved (i.e., overflowed) to k-d tree 520. At this point only bucket 510 is smaller than k-d tree 520 and bucket 510 has N images, which can all fit into k-d tree 520. The N images stored in bucket 510 are also moved to k-d tree 520. In practice, a new k-d tree is constructed that contains the N+1 images, and this k-d tree becomes k-d tree 520. As a result, bucket 510 is now empty and k-d tree 520 now contains N+1 images.

The next N images are again added to bucket 510. At this point there are a total of 2N+1 images stored in the forest, with N images stored in bucket 510 and N+1 images stored in k-d tree 520. When the $(2N+2)^{th}$ image is to be added to the forest, at this point bucket 510 already contains N images and is full, and thus, the $(2N+2)^{th}$ image causes an overflow to another, larger k-d tree that is currently empty. At this point the smallest tree in the forest that is empty is k-d tree 530. Thus, the $(2N+2)^{th}$ image is overflowed to and stored in k-d tree 530. In addition, the images stored in bucket 510 and all the trees smaller than k-d tree 530 that can also fit in k-d tree 530 are also moved (i.e., overflowed) to k-d tree 530. At this point both bucket 510 and k-d tree 520 are smaller than k-d tree 530. Bucket 510 has N images, which can all fit into k-d tree 530. K-d tree 520 has N+1 images, which can all fit into k-d tree 530 as well. The N images stored in bucket 510 and the N+1 images stored in k-d tree 520 are also moved to k-d tree 530. In practice, a new k-d tree is constructed that contains the 2N+2 images, and this k-d tree becomes k-d tree 530. As a result, bucket 510 is now empty; k-d tree 520 is also empty; and k-d tree 530 now contains 2N+2 images.

The next N images are again added to bucket 510. At this point there are a total of 3N+2 images stored in the forest, with N images stored in bucket 510, no image stored in k-d tree 520, and 2N+2 images stored in k-d tree 530. The $(3N+3)^{th}$ image to be added to the forest causes another overflow. Since k-d tree 520 is empty at this point, the $(3N+3)^{th}$ image and the N images stored in bucket 510 are overflowed to and stored in k-d tree 520, because k-d tree 520 is currently the smallest tree in the forest that is empty. As a result, bucket 510 is now empty; k-d tree 520 now contains N+1 images; and k-d tree 530 now contains 2N+2 images.

The next N images are added to bucket 510. At this point there are a total of 4N+3 images stored in the forest, with N images stored in bucket 510, N+1 images stored in k-d tree 520, and 2N+2 images stored in k-d tree 530. The $(4N+4)^{th}$ image to be added to the forest causes another overflow. Both k-d tree 520 and k-d tree 530 are not empty at this point. Instead, the smallest tree in the forest that is empty is k-d tree 540. Thus, the $(4N+4)^{th}$ image is overflowed to and stored in k-d tree 540. In addition, all the images currently stored in bucket 510 and k-d trees 520 and 530 can also fit in k-d tree 540, and so they are all moved to k-d tree 540. In practice, a new k-d tree is constructed that contains the 4N+4 images, and this k-d tree becomes k-d tree 540. As a result, bucket 510 and k-d trees 520 and 530 are all empty, and k-d tree 540 contains 4N+4 images.

The process described above may be repeated as images are added to the forest. If the size limit of the forest is reached, another k-d tree may be added to the forest. This way, a k-d forest may be used to store any number of images, and the only practical limitation may be the availability of the memory storage space.

Figure 6A:
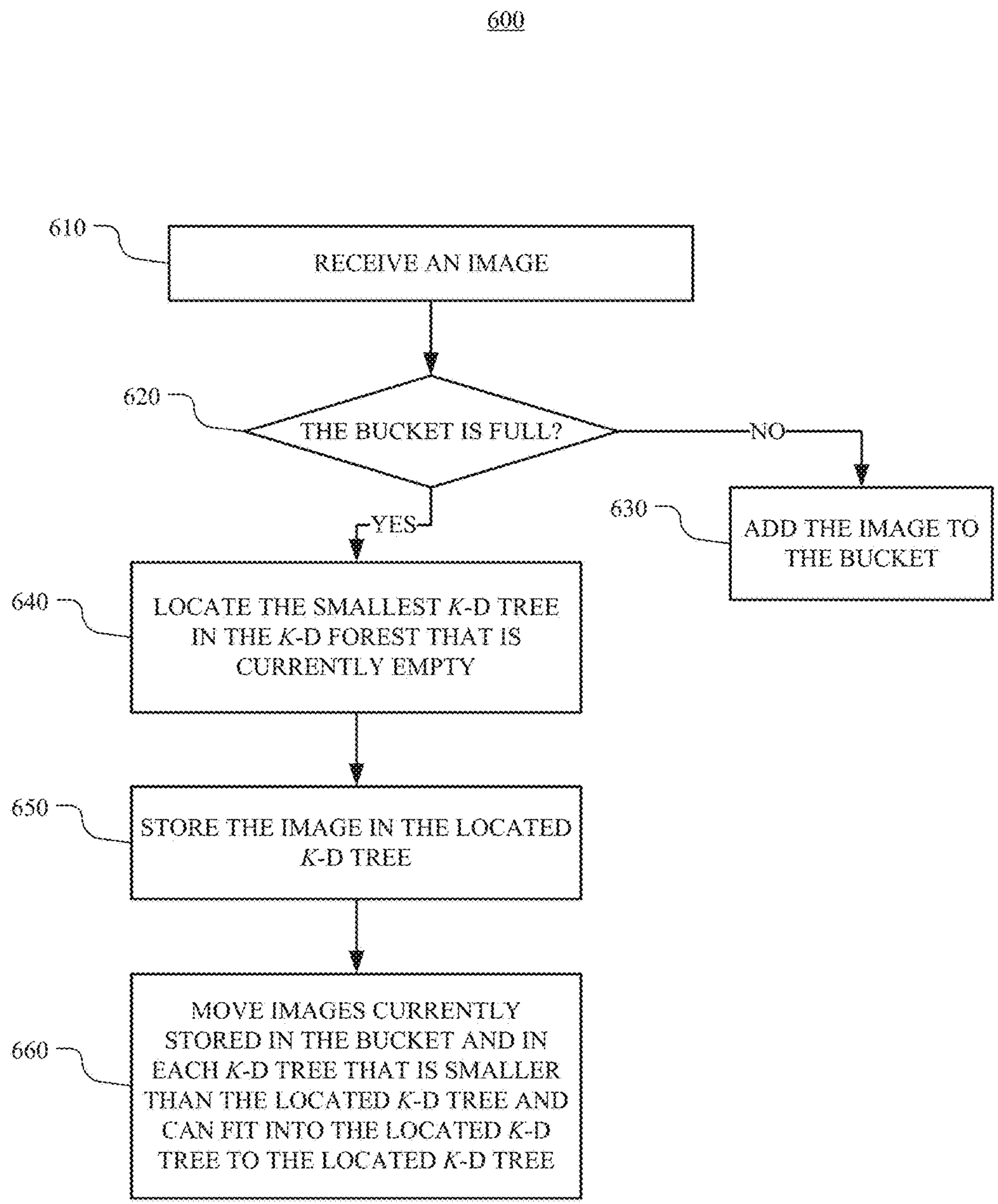
FIGS. 6A and 6B illustrate example methods for adding images to a k-d forest.
Figure 6B:
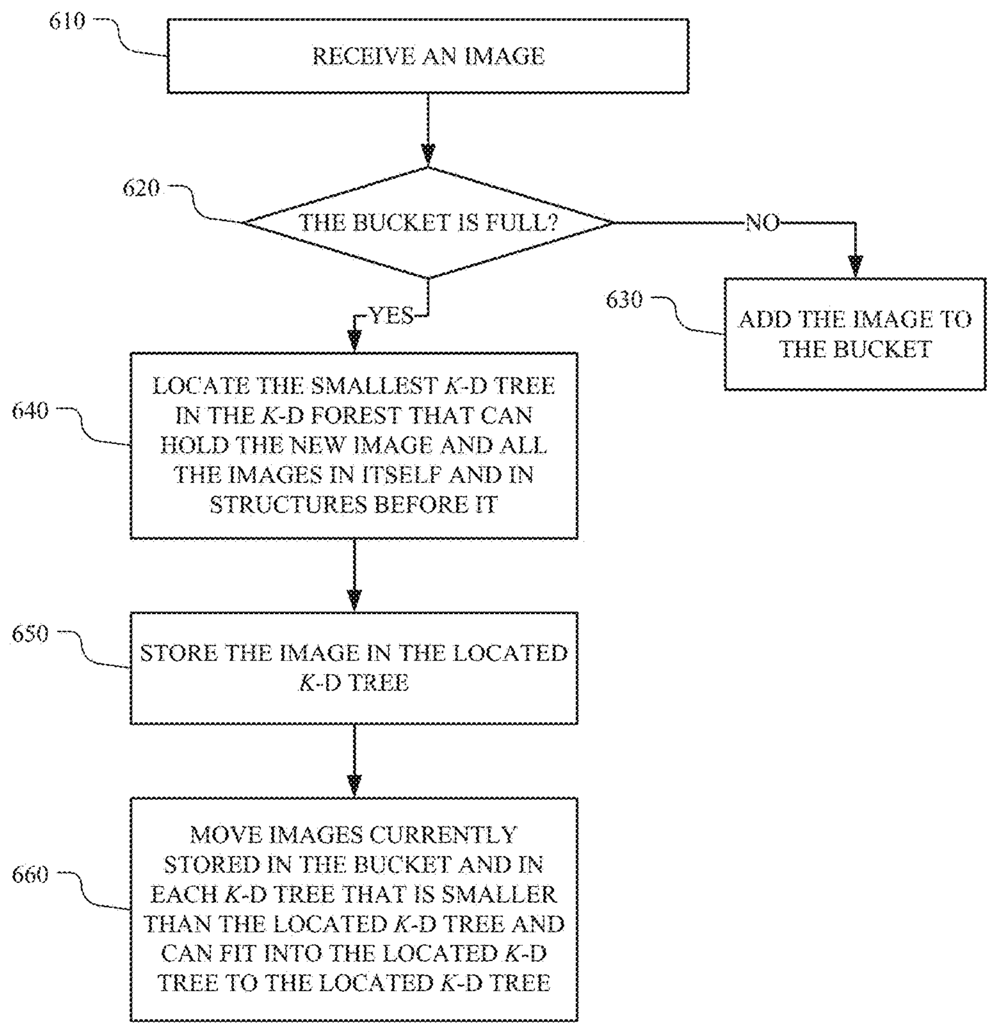

The process of adding images to a k-d forest is summarized in FIGS. 6A and 6B, which illustrate two slightly different implementations. Briefly, in particular embodiments as illustrated in FIG. 6A, upon receiving an image at STEP 610, if the bucket (e.g., bucket 510, which is the first element in the k-d forest) in the k-d forest is not yet full at STEP 620, then the image is added to the bucket at STEP 630. On the other hand, if the bucket in the k-d forest is already full at STEP 620, then the smallest k-d tree in the k-d forest that is currently empty is located at STEP 640 of FIG. 6A. The image is overflowed to and stored in the located k-d tree at STEP 650. In addition, at STEP 660, the images stored in the bucket are moved to and stored in the located k-d tree. Each k-d tree smaller than the located k-d tree and has images that can all fit in the located k-d tree is determined and its images are moved to and stored in the located k-d tree as well.

Particular embodiments may repeat one or more steps of the method of FIG. 6, where appropriate. For example, the steps of FIG. 6 may be repeated each time an image is to be added to the k-d forest. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

With the above process, in most cases, images are added to the bucket and the smaller trees in the forest (e.g., bucket 510 and k-d trees 520 and 530). This means that in most cases, only the smaller trees need to be constructed. The larger trees are constructed rarely. Since it is faster to construct smaller trees than larger trees, the process may improve performance.

With particular implementations, deleting an image from the k-d forest may be performed lazily. When an image is to be deleted, instead of removing the image from the k-d tree it is stored in immediately, which may result in the reconstruction of that k-d tree (e.g., in order to keep the tree balanced), the image is merely marked or flagged as being deleted. The node in the k-d tree corresponding to the image is not actually removed. When next time the images of this k-d tree are moved (i.e., overflowed) to another, larger k-d tree, only the undeleted images in this k-d tree are moved to the other k-d tree. The deleted images are not moved over but are discarded. Thus, the actual deletion of the images occurs at the time of overflow, and does not require additional tree processing.

Note that when the rate of object deletions is close to the rate of object additions, a small number of nodes actually get deleted in the trees of the k-d forest. When an overflow occurs and images are moved from a smaller k-d tree to a larger one, only the undeleted images (i.e., those images in the smaller tree not marked as being deleted) are actually overflowed and moved to the larger tree. Therefore, the total number of overflowed images may be smaller than the smallest empty tree in the forest, to which the images are to be overflowed. In fact, sometimes one of the trees that should be overflowed (i.e., a tree that is not empty) may itself be enough to hold all the undeleted nodes corresponding to the undeleted images that need to be overflowed.

For example, supposed that in FIG. 5, k-d tree 540 with a size of 8N nodes is located to be the next empty tree upon an overflow. All the undeleted images from bucket 510 and k-d trees 520 and 530 should be collected and moved to k-d tree 540. However, if some nodes in bucket 510 or k-d trees 520 and 530 have been marked for deletion, so that the total number of undeleted nodes in bucket 510 and k-d trees 520 and 530 is actually less than or equal to 4N, then it is possible to store all the undeleted nodes currently in bucket 510 and k-d trees 520 and 530 in k-d tree 530 itself. In practice, such scenario happens often due to deletion, especially when batch processing the images.

Consequently, in particular embodiments, when batch processing, the deletions are performed before the additions. Thus, when there is an overflow due to adding new images to the bucket, the deleted images are discarded in the process, resulting in smaller k-d trees and less memory being used.

In particular embodiments, as illustrated in FIG. 6B, when combining addition and lazy deletion, especially in cases of batch processing, STEP 640 of FIG. 6B may be modified, from STEP 640 of FIG. 6A, to locate the smallest k-d tree in the forest that can hold the new image received at STEP 610 as well as all the undeleted images in itself and in all those k-d trees smaller than itself. Then for STEPS 650 and 660, the newly received image, all the undeleted images in those k-d trees smaller than the located tree, and all the undeleted images in the located tree are stored in the located tree.

To further explain, consider a specific example. Suppose that at some point: (1) the bucket has N undeleted images in total and so is full; (2) the first k-d tree has N undeleted images; (3) the second k-d tree has N undeleted images; (4) the third k-d tree has 6N undeleted images; (5) the fourth k-d tree has 14N undeleted images; and (6) the fifth k-d tree is empty. The rest of the forest has a mixture of partially filled and empty trees.

Upon receiving a new image, since the bucket is already full, the new image causes an overflow.

In one case, the smallest empty tree in the forest is located. This is the fifth k-d tree, which can hold up to 32N nodes corresponding to 32N images. Since all the deleted images are discarded, the actually number of images stored in the fifth k-d tree is 1+N+N+N+6N+14N=23N+1. This means a large balanced k-d tree is constructed as the fifth k-d tree to store only 23N+1 images.

In contrast, in another case, the smallest tree in the forest that can hold all the undeleted images before it as well as in itself is located. This may be done by accumulating the number of undeleted images, which are already maintained, starting from the leftmost structure (i.e., the bucket) of the forest. Thus, for the bucket, there are N+1 images with the 1 new image, but the bucket has a capacity of only N. For the first k-d tree, there are 2N+1 images, but the first k-d tree has a capacity of 2N. For the second k-d tree, there are 3N+1 images, but the second k-d tree has a capacity of 4N. So the search for the right structure may stop here.

The undeleted images in the bucket and the first and second k-d trees are all stored in the second k-d tree. A new balanced k-d tree of 3N+1 images is constructed, which becomes the second k-d tree in the forest. Then, the bucket is empty. The first k-d tree is empty. The second k-d tree has 3N+1 undeleted images. The third k-d tree has 6N undeleted images. The fourth k-d tree has 14N undeleted images. The fifth k-d tree is empty.

With the second process, a k-d tree of only 3N+1 images needs to be constructed, as compared to the first process where a k-d tree of 23N+1 images needs to be constructed. This difference can become very big in practice, so that giant tree constructions become unnecessary most of the times. The second process illustrates another key benefit of lazy deletion during the overflow process of addition.

With particular implementations, a counter may be associated with each k-d tree indicating how many undeleted images are currently stored in that k-d tree. If an image is to be deleted from the k-d tree, the tree's counter may be decreased accordingly. When comparing an image with the images stored in a k-d tree, the search algorithm described above may ignore any images in the k-d tree that are marked as being deleted.

In particular embodiments, to further improve performance, image addition and deletion may be performed in aggregation (i.e., as batch processing). Instead of adding or deleting one image at a time, n images (e.g., n=1000) may be added or deleted at the same time. For example, n images may be partitioned into a k-d tree at the same time using the process described above in connection with FIG. 4.

In particular embodiments, images may be grouped into clusters based on their respective contents. Each cluster includes images having the same or similar content. With specific implementations, given two images X and Y, if the proximity measurement between images X and Y is less than a predefined threshold, then images X and Y are grouped into the same cluster. Otherwise, images X and Y are placed into different clusters.

In particular embodiments, a cache structure may be used in connection with a k-d forest to store a dynamic collection of images, and more specifically, to store clusters of images. With specific implementations, a cache may include any number of entries, where each entry corresponds to a specific cluster of images. Each cluster has a representative image, a counter, a timestamp, and a list of images. The content of the representative image represents the content of the images belonging to this cluster and the representative image is used for content comparisons. With some implementations, the representative image of each cluster is the first image that belongs to that cluster. In other words, it is the image that causes a new cluster to be created. (The representative image is explained further below in connection with STEP 762 of FIG. 7.) In particular embodiments, the representative images of the clusters existing in the cache are stored in a k-d forest. Each representative image is stored as a node in a k-d tree that is a part of the k-d forest. With some implementations, in addition to the representative image, each node also includes a pointer pointing to the entry in the cache corresponding to the cluster associated with the representative image. The counter indicates the total number of images in the list of images in this cluster. Note that with this implementation, the counter does not count the representative image of a cluster. The timestamp indicates the most-recent time an image is added to this cluster, which is the most-recent time this cluster receives a "hit". The list of images includes all the images belonging to this cluster (i.e., all the images having content substantially match the content of this cluster's representative image).

The following illustrates an example cache.

| Representative Image | Counter | Timestamp | Images |
|---|---|---|---|
| A1 | 1 | 12:54:01 | A2 |
| B1 | 4 | 05:21:45 | B2, B3, B4, B5 |
| C1 | 0 | | |
| . . . | . . . | . . . | . . . |

With some implementations, the entries of the cache is sorted based on their timestamps (e.g., from the oldest or smallest timestamp or the newest or largest timestamp). With some implementations, the cached may be stored in a suitable data structure, such as a balanced binary tree. One advantage is that these structures are always sorted by a given field (e.g., the timestamp) and are dynamically balanced to keep search time small even with new additions and deletions.

Figure 7:
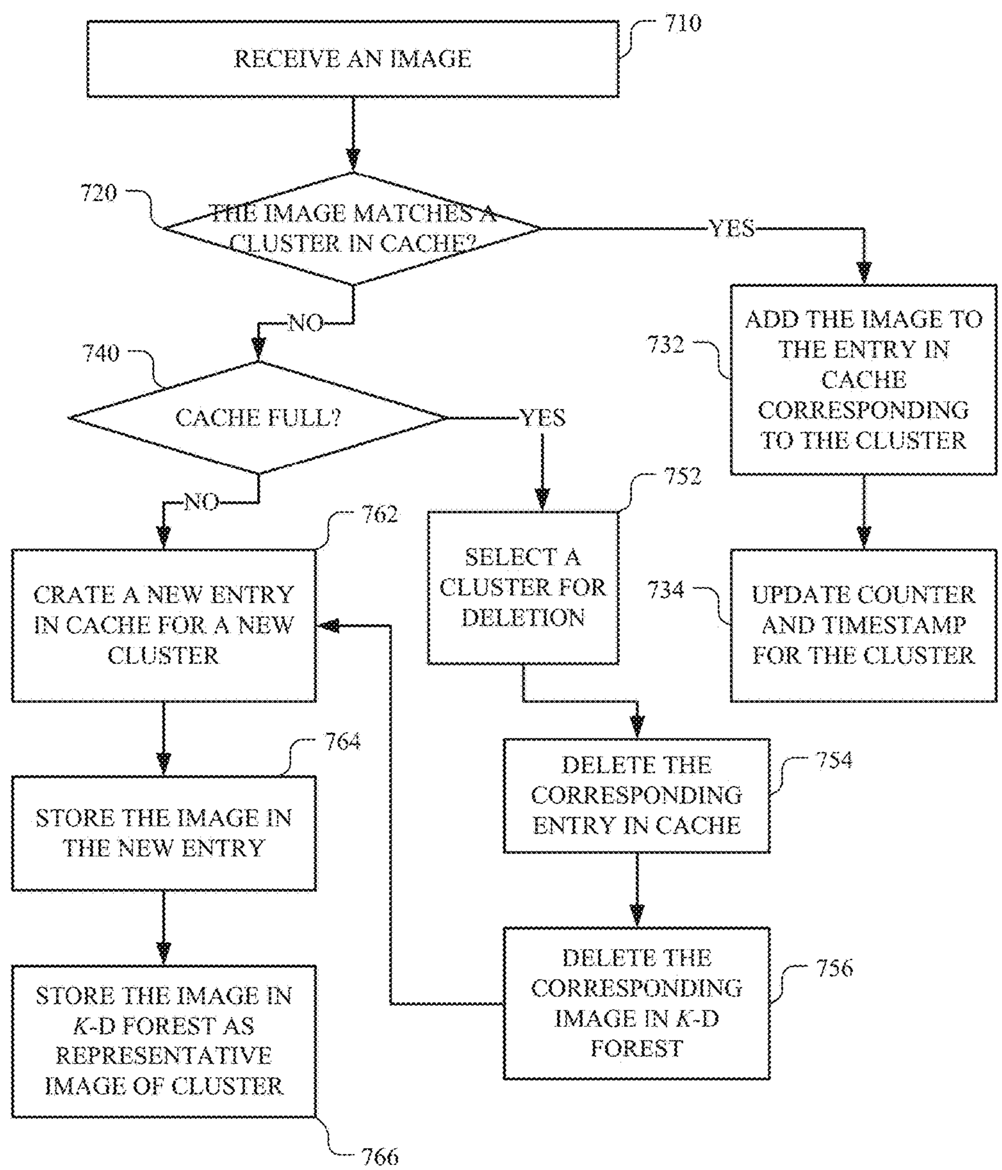
FIG. 7 illustrates an example method for clustering images using a cache structure in connection with a k-d forest.

FIG. 7 illustrates an example method for clustering images using a cache and a k-d forest. The steps illustrated in FIG. 7 may be repeated each time an image is uploaded (e.g., to social-networking system 160).

First, suppose that at STEP 710, an image, image A2, is received. At STEP 720, it may be determined whether image A2 belongs to any existing cluster currently in the cache. Suppose that at this point, there are two entries in the cache, corresponding to two clusters respectively. The representative image of the first cluster is image A1. The representative image of the second cluster is image B1. With some implementations, to determine whether image A2 belongs to either of these two clusters, the proximity measurement between images A1 and A2 may be computed (e.g., using their respective sets of elements). If needed, the proximity measurement between images B1 and A2 may also be computed. Suppose that the proximity measurement between images A1 and A2 is less than the threshold. This indicates that image A2 belongs to the first cluster, for which image A1 is its representative image.

In practice, the cache may have many entries (e.g., millions of entries). It takes a very long time to separately compare image A2 with millions of representative images. Therefore, alternatively, with other implementations, the comparison may take advantage of the k-d forest, since the representative image of each cluster is stored in the k-d forest. With some implementations, each node used to store a representative image also includes a pointer pointing to the entry in the cache corresponding to the cluster associated with the representative image.

Upon receiving image A2, image A2 is compared with the representative images of the existing clusters by performing a search for image A2 with respect to the bucket (e.g., bucket 510) and each non-empty k-d tree used to store the representative images. For the bucket, the search may involve having the proximity measurement between image A1 and every representative image in the bucket computed and compared to a threshold to determine whether image A1 is sufficiently similar to any of these representative images in the bucket. For a k-d tree, the search may be performed using the logarithmic search process described above. The searches with respect to the bucket and the k-d trees may be performed sequentially or in parallel, and may end when at least one match is found (i.e., at least one representative image in either the bucket or a k-d tree is sufficiently similar to image A2) or when no match is found.

If a match is found, the pointer stored in the node corresponding to the matched representative image may be used to access the entry in the cache corresponding to the cluster associated with the matched representative image (e.g., following the pointer to the entry). Again, suppose that the search result indicates that image A2 is sufficiently similar to image A1, which indicates that image A2 belongs to the first cluster, for which image A1 is its representative image.

In this case, at STEP 732, image A2 is added to the list of images of the first cluster. At STEP 734, the counter of the first cluster is incremented by 1, and the timestamp of the first cluster is updated to the time image A2 is received or image A2 is added to the first cluster. The processing of image A2 ends at this point.

Next, suppose that at STEP 710, another image, image C1, is received. At STEP 720, it may be determined whether image C1 belongs to any existing cluster currently in the cache. Again, suppose that at this point, there are two entries in the cache, corresponding to two clusters respectively. The representative image of the first cluster is image A1. The representative image of the second cluster is image B1. To determine whether image C1 belongs to either of these two clusters, with some implementations, a search may be performed to compare image C1 with the representative images stored in the k-d forest, in a similar process as described above in connection with image A2. Alternatively, with other implementations, the proximity measurement between images A1 and C1 may be computed (e.g., using their respective sets of elements). The proximity measurement between images B1 and C1 may also be computed.

Suppose that image C1 does not belong to either of the two existing clusters currently in the cache, as both the proximity measurements between images A1 and C1 and between images B1 and C1 are greater than the threshold. In this case, there is no cluster currently existing in the cache to which image C1 belongs. This means that a new entry needs to be added to the cache, corresponding to a new cluster of images.

At STEP 740, it may be determined whether the cache is already full. If the cache is full, an existing entry in the cache needs to be deleted before a new entry may be added to the cache. Suppose that the cache is not yet full. In this case, at STEP 762, a new entry in the cache may be created corresponding to a new cluster (e.g., the third cluster) of images to which image C1 should belong. Since image C1 is the image causing this new cluster to be created and is the first image added to this new cluster, image C1 may be used as the representative image for this new cluster. At STEP 764, image C1 is stored in the entry in the cache corresponding to the new cluster as its representative image. In addition, the counter of the new cluster is initialized to 0, and the timestamp of the new cluster is initialized to either the time image C1 is received or to the time the new cluster is created. At STEP 766, image C1 is added to and stored in a k-d forest (e.g., using the process described above in connection with FIG. 6). The processing of image C1 ends at this point.

Note that for each cluster of images in the cache, only its representative image is stored in the k-d forest. The other images belonging to the cluster are not stored in the k-d forest.

Next, suppose that after some time has passed, the cache becomes full (i.e., all the available entries in the cache already correspond to specific clusters of images). Again, at STEP 710, a new image, image Z1, is received. Suppose that at STEP 720, it is determined that image Z1 does not belong to any of the clusters currently existing in the cache. This means that a new entry needs to be added to the cache, corresponding to a new cluster of images to which image Z1 may belong. However, since the cache is already full at this point as determined at STEP 740, an existing entry in the cache needs to be deleted.

At STEP 752, the entry in the cache having the oldest timestamp may be selected for deletion. Since the timestamp of each entry indicates the most-recent time an image is added to the corresponding cluster (i.e., the most-recent time there is a hit to the corresponding cluster), the cluster with the oldest timestamp is the cluster that has the oldest hit. With some implementations, the entries of the cache are always sorted based on their timestamps (e.g., increasingly from the oldest to the newest). Thus, the cluster with the oldest timestamp corresponds to the oldest entry in the cache and can be readily found.

Suppose that the second cluster in the cache, for which image B1 is its representative image, has the oldest timestamp. The entry in the cache corresponding to the second cluster is deleted from the cache at STEP 754. In addition, image B1 (i.e., the representative image of the cluster that has been deleted from the cache) is deleted from the k-d forest at STEP 756. Deleting images from the k-d forest may be performed lazily as described above. The node in the k-d forest corresponding to image B1 may be marked as "deleted" but not actually deleted until an overflow involving the k-d tree to which the node belongs occurs.

At STEP 762, the available entry resulting from deleting the second cluster is used to create a new cluster for image Z1. At STEP 764, image Z1 is stored in the entry as the cluster's representative image. The counter of the new cluster is initialized to 0. The timestamp of the new cluster may be initialized either to 0 or to the time image Z1 is received or to the time the new cluster is created. At STEP 766, image Z1 is added to and stored in the k-d forest. The processing of image Z1 ends at this point.

If, some time later, an image, image B6, is received, and image B6 should belong to the cluster for which image B1 is its representative image, then a new entry is created in the cache for image B6, since the cluster to which image B6 should belong has already been removed from the cache and image B6 does not belong to any cluster currently existing in the cache. Image B6 may become the representative image of the newly created cluster.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

A cache such as the one described above may be used to collect statistical information in a system. More specifically, with one implementation, the cache may reflect a sliding window based on the number of clusters. In this case, the cache may be limited to a total number of n entries (e.g., n=10 million), corresponding to n image clusters. The entry corresponding to the cluster with the oldest hit is removed first when needed (e.g., when the cache is full). Thus, at any given time, the hash contains the n most-recently hit clusters. Furthermore, the top m (m<n) most-recently hit clusters may be determined from the cache by examining the timestamp of each cluster in the cache.

With some implementations, the entries of the cache are sorted based on their timestamps (e.g., increasingly from the oldest to the newest). In this case, the top m most-recently hit clusters may be determined by selecting the first or last m entries in the sorted cache.

Another query may be getting the top m "heaviest" clusters. These are the top m clusters that are within the sliding window with the maximum number of elements in their clusters. To get this, the counters of all the entries in the cache may be sorted in the descending order. Then, the top m heaviest clusters correspond to the top m counters.

With another implementation, the cache may be limited to a specific time period (e.g., 24 hours). The entries in the cache correspond to image clusters that have received at least one hit during the specific time period. An entry corresponding to a cluster that does not receive any hit during the specific time period (e.g., past 24 hours) is removed. Thus, at any given time, the hash contains the clusters that have received at least one hit during the most-recent specific time period.

With some implementations, the entries of the cache are sorted based on their timestamps (e.g., increasingly from the oldest to the newest). In this case, during any update to the cache, the top entry of the cache (i.e., the entry with the oldest timestamp) is ensured to be within the time period (e.g., past 24 hours). If not, the sorted entries in the cached are deleted from the top down until the top-most entry is within the time period.

Furthermore, with specific implementations, the cache may indicate the top n individual images or the top n image clusters that have received the most hits during a specific time period.

In particular embodiments, the system may implement parallel processing or load balancing to improve performance. There may be multiple computing devices, each maintaining its own cache and k-d forest. When collecting statistical information (e.g., the top 100 image clusters that have received the most hits during the past 24 hours), the system may query each computing device for the same statistical information, and then merge the results received from all the computing devices. For example, suppose that there are 4 computing devices in the system. Each computing device may provide the top 100 image clusters that have received the most hits during the past 24 hours as determined based on its own cache. The 4 sets of results may then be merged together (e.g., to remove duplicate image clusters).

Figure 8:
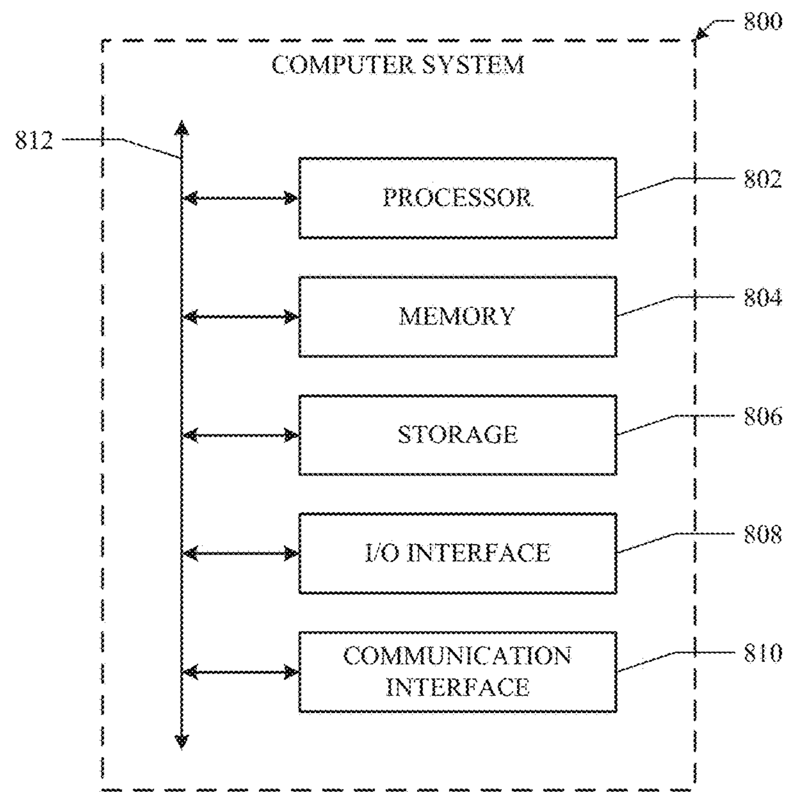
FIG. 8 illustrates an example computer system.

FIG. 8 illustrates an example computer system 800. In particular embodiments, one or more computer systems 800 perform one or more steps of one or more methods described or illustrated herein (e.g., performing image comparison). In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by a computing device, receiving a content object;

by the computing device, storing content objects in a list;

by the computing device, determining whether the list of the stored content objects is full, wherein the received content object is represented as a vector of elements and each of the stored content objects is represented as a vector of elements;

by the computing device, identifying a corresponding node of a k-dimensional tree for each of the stored content objects and the received content object based on determining one or more median vectors from the vectors of the stored content objects, wherein:

each node of the k-dimensional tree is configured to store the vector of a particular one of the stored content objects and the received content object;

the k-dimensional tree comprises a top level comprising a root node configured to store information corresponding to a particular one of the median vectors, the particular one of the median vectors corresponding to a median content object of the stored content objects; and the k-dimensional tree comprises a second level comprising a plurality of leaf nodes;

by the computing device, moving information corresponding to the vector of one or more of the stored content objects and the received content object from the list to the corresponding node of the k-dimensional tree;

by the computing device, calculating a proximity measurement comprising a difference between a value of a first element of the vector of the received content object and a value of a first element of the particular one of the median vectors, wherein the vector of each node is representative of a cluster of content objects;

by the computing device, identifying a particular one of the clusters of content objects based on the proximity measurement; and by the computing device, updating an entry of a cache corresponding to the identified cluster to include the received content object.

2. The method of claim 1, wherein the identification of the corresponding node of the k-dimensional tree for each of the stored content objects and the received content object comprises:

comparing the value of the first element of the vector of the received content object to the value of the first element of the particular one of the median vectors;

identifying a particular one of the leaf nodes based on the comparison; and comparing a second element of the vector of the received content object to a second element of a vector of the stored content object of the identified leaf node.

3. The method of claim 1, wherein determining the median vectors comprises:

identifying the median content object of the root node based on a value of the first element of the respective vectors of the stored content objects;

identifying a particular one of the stored content objects for a first leaf node based on determining a median of the content objects having the value of the first element of their respective vectors that is higher than the value of the first element of the particular one of the median vectors; and identifying a particular one of the stored content objects for a second leaf node based on determining a median of the content objects having the value of the first element of their respective vectors that is lower than the value of the first element of the particular one of the median vectors.

4. The method of claim 1, wherein the identification of the particular cluster comprises determining whether the received content object matches one or more of the compared objects based on the proximity measurement being less than a pre-determined threshold.

5. The method of claim 1, further comprising adding a new entry to the cache in response to the calculated proximity measurement being higher than the pre-determined threshold.

6. The method of claim 1, wherein the cache comprises a plurality of entries, wherein each entry comprises:

an identifier of a content object representative of each cluster of content objects;

a counter of the number of the content objects of each cluster;

a timestamp; and a list of content objects of the cluster.

7. The method of claim 1, wherein the proximity measurement is performed using a subset of the plurality of elements of the vectors.

8. The method of claim 1, further comprising:

locating a particular one of the nodes of the k-dimensional tree corresponding to a particular one of the stored content objects that is flagged for deletion; and indicating the stored content object of the located node is flagged for deletion; and decrementing a counter tracking a number of the stored content objects.

9. The method of claim 1, wherein:

each of the stored content objects is an image;

the list is a blacklist; and the received content object is an image being added to the blacklist.

10. The method of claim 1, wherein each node of the k-dimensional tree is further configured to store an identifier, a subset of the stored vector, or an index indicative of a beginning address of memory storing the vector.

11. The method of claim 1, wherein the moved information corresponds to undeleted content objects.

12. The method of claim 1, wherein the k-dimensional tree comprises a k-dimensional forest.

13. One or more computer-readable non-transitory storage media embodying software that is operable when executed to:

receive a content object;

store content objects in a list;

determine whether the list of the stored content objects is full, wherein the received content object is represented as a vector of elements and each of the stored content objects is represented as a vector of elements;

identify a corresponding node of a k-dimensional tree for each of the stored content objects and the received content object based on determining one or more median vectors from the vectors of the stored content objects, wherein:

each node of the k-dimensional tree is configured to store the vector of a particular one of the stored content objects or the received content object;

the k-dimensional tree comprises a top level comprising a root node configured to store information corresponding to a particular one of the median vectors, the particular one of the median vectors corresponding to a median content object of the stored content objects; and the k-dimensional tree comprises a second level comprising a plurality of leaf nodes;

move information corresponding to the vector of one or more of the stored content objects and the received content object from the list to the corresponding node of the k-dimensional tree;

calculate a proximity measurement comprising a difference between a value of a first element of the vector of the received content object and a value of a first element of the particular one of the median vectors, wherein the vector of each node is representative of a cluster of content objects;

identify a particular one of the clusters of content objects based on the proximity measurement; and update an entry of a cache corresponding to the identified cluster to include the received content object.

14. The media of claim 13, wherein the software is further operable to:

compare the value of the first element of the vector of the received content object to a value of the first element of the particular one of the median vectors;

identify a particular one of the leaf nodes based on the comparison; and compare a second element of the vector of the received content object to a second element of a vector of the stored content object of the identified leaf node.

15. A system comprising:

one or more processors; and a memory coupled to the processors comprising instructions executable by the processors, the processors operable when executing the instructions to:

receive a content object;

store content objects in a list;

determine whether the list of the stored content objects is full, wherein the received content object is represented as a vector of elements and each of the stored content objects is represented as a vector of elements;

identify a corresponding node of a k-dimensional tree for each of the stored content objects and the received content object based on determining one or more median vectors from the vectors of the stored content objects, wherein:

each node of the k-dimensional tree is configured to store the vector of a particular one of the stored content objects or the received content object;

the k-dimensional tree comprises a top level comprising a root node configured to store information corresponding to a particular one of the median vectors, the particular one of the median vectors corresponding to a median content object of the stored content objects; and the k-dimensional tree comprises a second level comprising a plurality of leaf nodes;

move information corresponding to the vector of one or more of the stored content objects and the received content object from the list to the corresponding node of the k-dimensional tree;

calculate a proximity measurement comprising a difference between a value of a first element of the vector of the received content object and a value of a first element of the particular one of the median vectors, wherein the vector of each node is representative of a cluster of content objects;

identify a particular one of the clusters of content objects based on the proximity measurement; and update an entry of a cache corresponding to the identified cluster to include the received content object.

16. The system of claim 15, wherein the processors are further operable to:

compare the value of the first element of the vector of the received content object to a value of the first element of the particular one of the median vectors;

identify a particular one of the leaf nodes based on the comparison; and compare a second element of the vector of the received content object to a second element of a vector of the stored content object of the identified leaf node.

* * * * *